United States Patent [19]

Pawl

[11] Patent Number: 4,969,793
[45] Date of Patent: Nov. 13, 1990

[54] POWER TRUNK LIFT

[76] Inventor: E. Timothy Pawl, P.O. Box 5425, 4960 Arrowhead Rd., West Bloomfield, Mich. 48033

[21] Appl. No.: 156,246

[22] Filed: Feb. 16, 1988

[51] Int. Cl.$^5$ .............................................. B65G 67/00
[52] U.S. Cl. .................... 414/462; 414/540; 414/495; 414/641; 414/522; 254/122; 187/18
[58] Field of Search .............. 414/462, 495, 522, 641; 254/9 R, 9 B, 9 C, 122, 126; 187/8.71, 8.72, 18; 248/421; 74/520, 521; 296/37.1

[56] References Cited

U.S. PATENT DOCUMENTS

| 2,568,628 | 9/1951 | Herring | 414/462 |
|---|---|---|---|
| 2,797,833 | 7/1957 | Cash | 414/495 |
| 2,862,689 | 12/1958 | Dalrymple et al. | 254/122 X |
| 2,890,908 | 6/1959 | McLean et al. | 414/540 X |
| 2,953,287 | 9/1960 | Werner | 474/462 X |
| 3,011,669 | 12/1961 | Sylvester | 414/462 |
| 3,627,158 | 12/1971 | Kobasic | 414/462 |
| 4,025,053 | 5/1977 | Stickle | 254/122 |
| 4,455,948 | 6/1984 | Torres | 108/44 |
| 4,604,022 | 8/1986 | Bourgraf | 414/462 X |
| 4,725,183 | 2/1988 | Smillie | 414/345 |

FOREIGN PATENT DOCUMENTS 1756778  4/1970  Fed. Rep. of Germany ...... 414/495

Primary Examiner—Frank E. Werner
Attorney, Agent, or Firm—Charles W. Chandler

[57] ABSTRACT

A power-operated lift, adapted to be mounted in a vehicle trunk has linkage means for raising a load-supporting platform in a vertical direction. The platform can be manually moved in a horizontal direction to remove the load from the trunk. The platform can be pivoted about the frame to provide access to a wheel well beneath the lift. A reversible motor is connected to the linkage for either raising or lowering the platform with respect to the trunk floor.

7 Claims, 5 Drawing Sheets

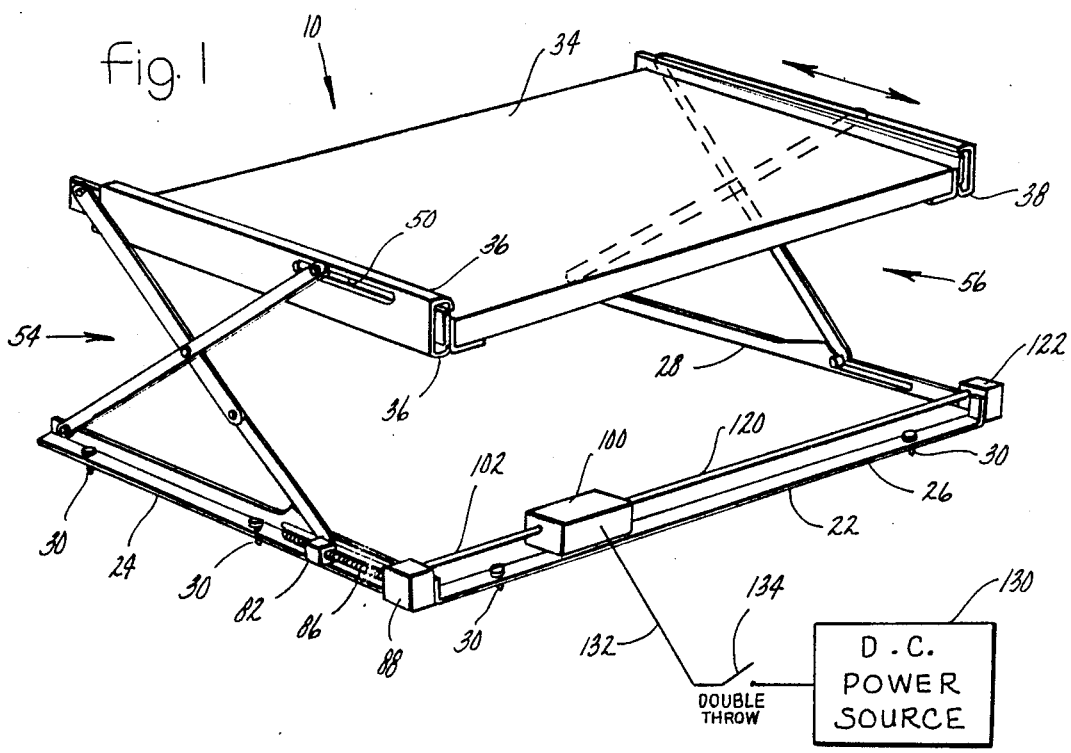
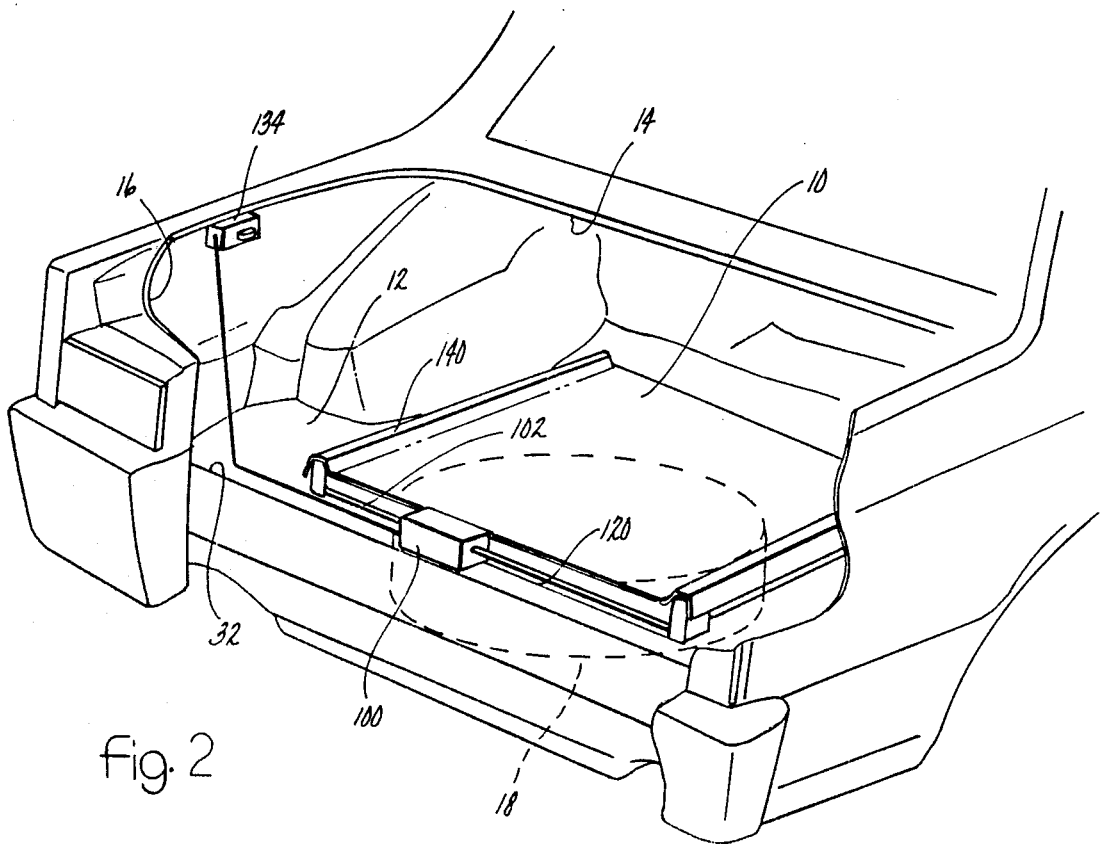

POWER TRUNK LIFT

BACKGROUND OF THE INVENTION

This invention is related to a lifting mechanism adapted to be installed in the trunk of a vehicle or the like, and more particularly, to a power-operated lift for raising a load-bearing platform in a vertical direction, and permitting the user to slide the platform in a horizontal direction to remove the load from the trunk in a motion independent of the lifting motion.

Travelers, salespersons, golfers, and others sometimes carry a relatively heavy, bulky load in a vehicle trunk. Such a load is difficult to manipulate because of its bulk and weight. To overcome the problem of transporting such a load in the trunk, the prior art discloses a mechanism such as is illustrated in U.S. Pat. No. 4,604,022 which issued Aug. 5, 1986 to Elroy E. Bourgraf. A lift platform is mounted in the trunk of the vehicle for supporting a load. The platform is mounted on a pair of levers pivotally mounted on a base. A pair of handles are connected to the levers to swing the platform from its lower, storage position to a raised position in an arc in which the load is removed through the trunk opening, either with or without a power assist.

SUMMARY OF THE INVENTION

The broad purpose of the present invention is to provide an improved powered, lifting mechanism having particular utility for transporting a load in a vehicle trunk. The preferred mechanism may be used in other applications where a load is to be raised in a vertical direction and then moved in a horizontal direction.

The preferred embodiment of the invention employs a base installed on the trunk floor. The base has a central opening sufficiently large to permit a tire to be removed from a storage well beneath the base.

A reversible motor is mounted on one side of the base adjacent the trunk opening. The motor is connected through a pair of flexible drive shafts to a pair of right angle gear boxes mounted on the base sides. Worm (ACME) screw shafts integral with the gear boxes move a rotationally constrained drive nut fore and aft in a horizontal plane.

A platform is supported on a pair of identical linkage means mounted on opposite sides of the base. Each linkage comprises a pair of links. The lower end of one link is pivotally connected to one corner of the base. The upper end is slideably connected to a horizontal slider mechanism. The other link comprises a pair of legs connected together with overlapping ends and pivotally connected to the first link. The lower end of the second link is connected to a driven nut mounted on one of the worm screws and slideably connected to the horizontal base. The upper end of the second link is pivotally connected to the slider mechanism.

The arrangement is such that when the gear box worm (ACME) screw drive is advanced by the motor in one direction, the platform is lowered as the two links collapse toward a generally horizontal, parallel position. When the gear boxworm screw drive nut is moved in the opposite direction, the two links are unfolded in a scissors-like manner to raise the platform.

When the two links are in their lower, parallel position, the two-part link is adapted to inter-engage a pair of cam means to assist the drive nut in commencing its travel when the platform is to be raised from its lower storage position. This arrangement overcomes the problem of pivoting a link when the driving effort is initially toward the pivot point.

The slider mechanism supports the platform in such a manner that when the platform is in its raised position, the user can horizontally pull the platform from the trunk to either load or unload an article. The platform can also be manually raised about a rear pivot to gain access to the area (spare tire wheel well) beneath the base.

In another embodiment of the invention, the linkage mechanism comprises a toggle linkage powered by a motor that is raised and lowered with the platform as the toggle linkage is being operated.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views, and in which:

FIG. 1 is a partially schematic view of a power trunk lifting mechanism illustrating the preferred embodiment of the invention with the floor mat removed;

FIG. 2 illustrates the platform in its lower position, over a wheel well;

DESCRIPTION OF THE PREFERRED EMBODIMENT

Figure 3:
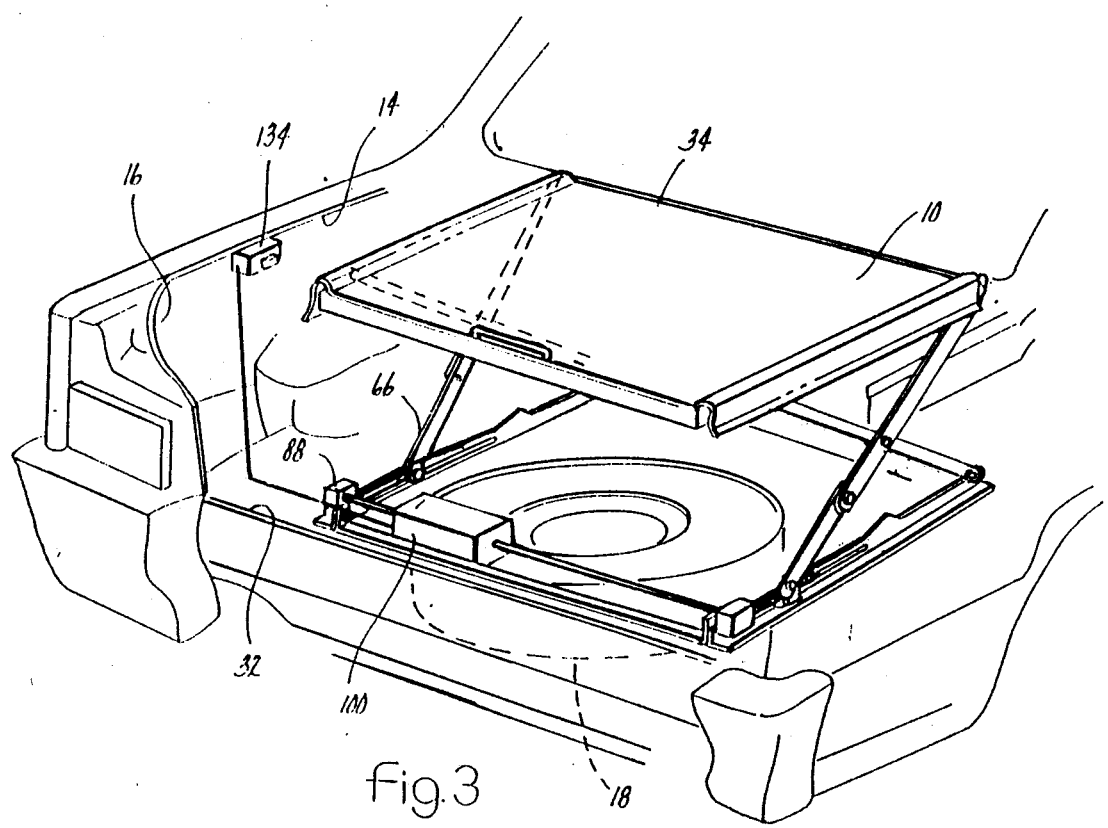
FIG. 3 is a view similar to FIG. 2 but showing the platform in its raised position.

Referring to FIGS. 1–4 and 7, a preferred power operated lift, generally indicated at 10, is mounted on the floor 12 of the trunk 14 of a vehicle having a rear opening 16. The trunk has an open topped wheel well 18 for storing spare tire 20.

Lift 10 includes a U-shaped base 22 comprising three metal structural elements 24, 26 and 28. Elements 24 and 28 are parallel to one another and attached to opposite ends of element 26. A plurality of fastener means 30 attach each element of the base to floor 12. Elements 24 and 28 are mounted on opposite sides of the top opening of wheel well 18. Element 26 is mounted adjacent rear wall 32 which defines the lower edge of trunk opening 16.

Figure 7:
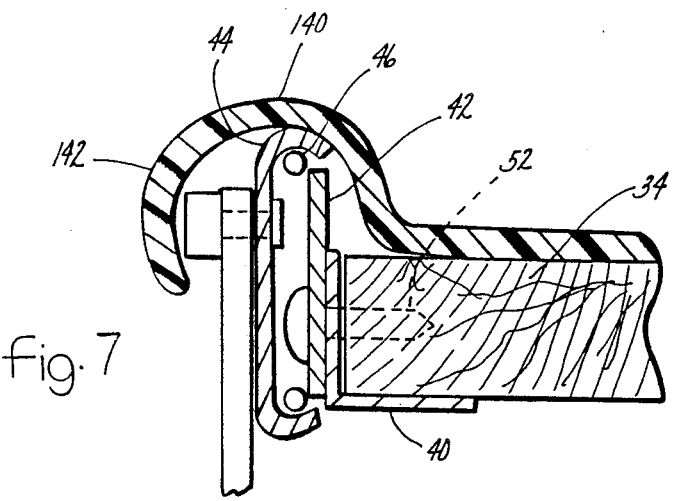
FIG. 7 is an enlarged fragmentary view showing a floor mat mounted on the platform such as to shield the linkage mechanism from the user's fingers.

Referring to FIGS. 1 and 7, the lift mechanism supports a rectangular load-bearing platform 34. A pair of slider means 36 and 38 support opposite side edges of the platform. The slider means are identical to one another except for a right and left hand relationship. Referring to FIG. 7, each slider means includes an elongated, metal structural angle element 40 attached as by welding, along the length of a conventional inner slider member 42. An outer, slider channel 44 is partially wrapped around the inner slider member. Ball bearing means 46 are disposed between member 42 and channel 44 so that they are freely longitudinally movable with respect to one another. The side edge of the platform is supported on the lower, horizontal wall of angle 40.

Still referring to FIGS. 1 and 7, the slider channel of each slider means has a longitudinal slot 50.

Figure 4:
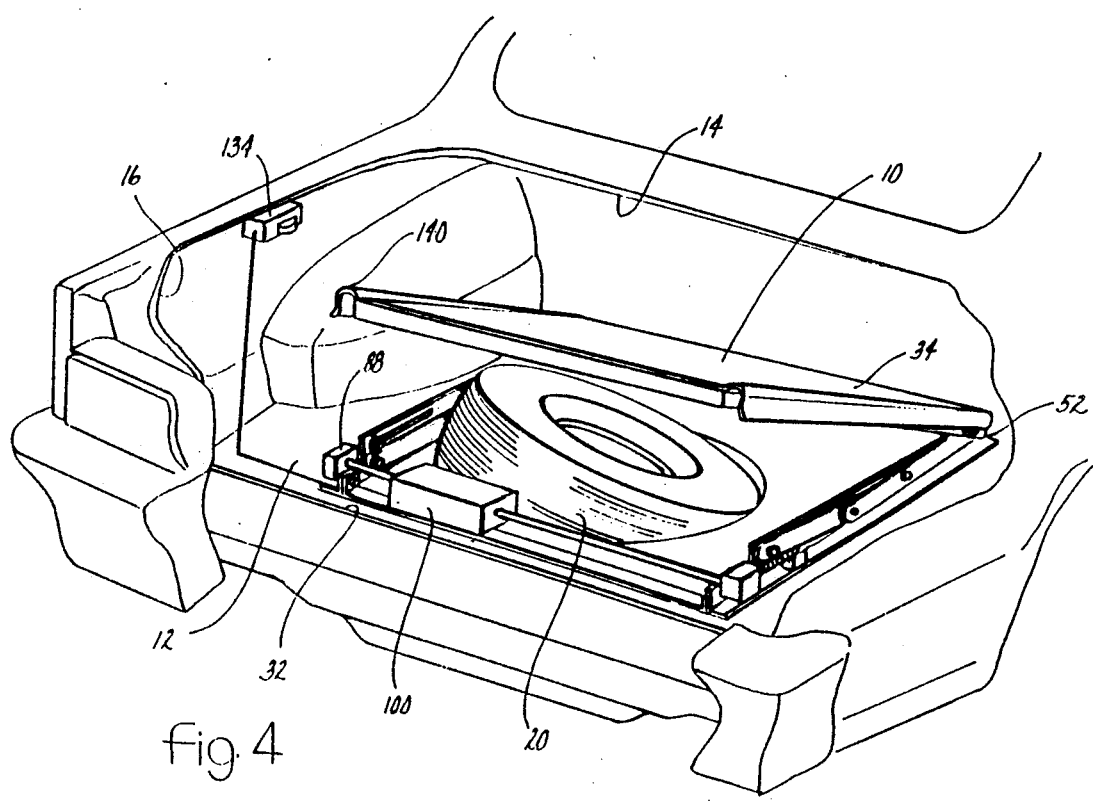
FIG. 4 is a view similar to FIG. 1, but showing the platform pivoted open to permit removal of a spare wheel from the wheel well.

A pivot pin 52 at the opposite end of each structural angle 40 is pivotally connected to the inside corners of the platform. Thus the platform can be raised about the pivot pins on the two slider means, as illustrated in FIG. 4.

A pair of link means 54 and 56 are mounted between the base and slider means 36 and 38 for raising and lowering the platform. Link means 54 and 56 are identical to one another except for a right and left hand relationship.

Figure 5:
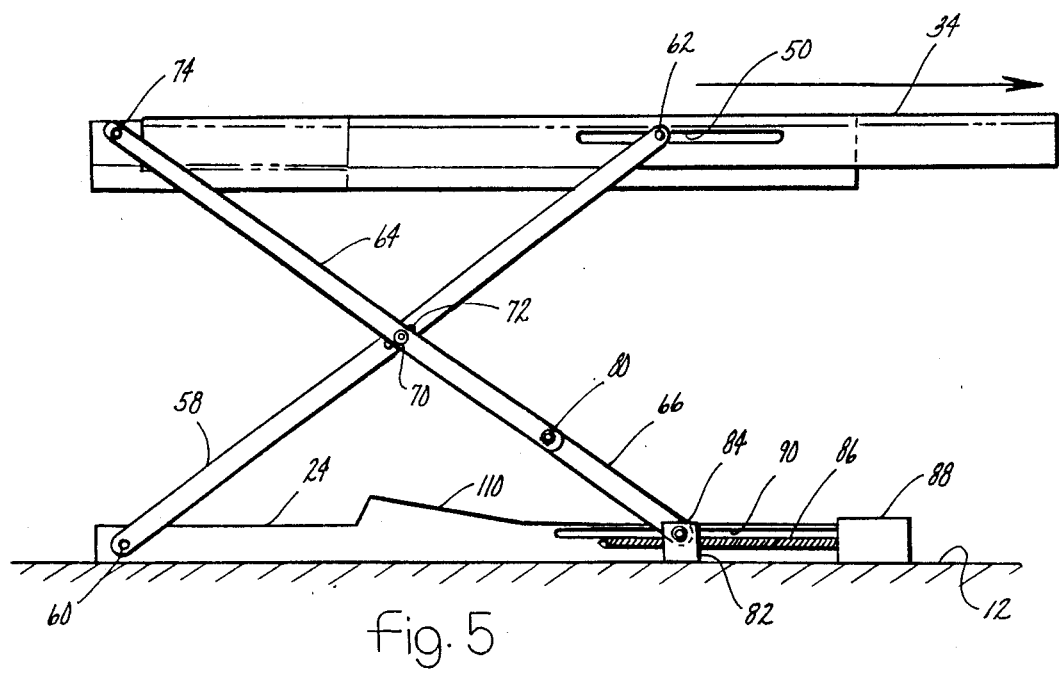
FIG. 5 is a view similar to FIG. 3 but showing the platform slid rearwardly.
Figure 6:
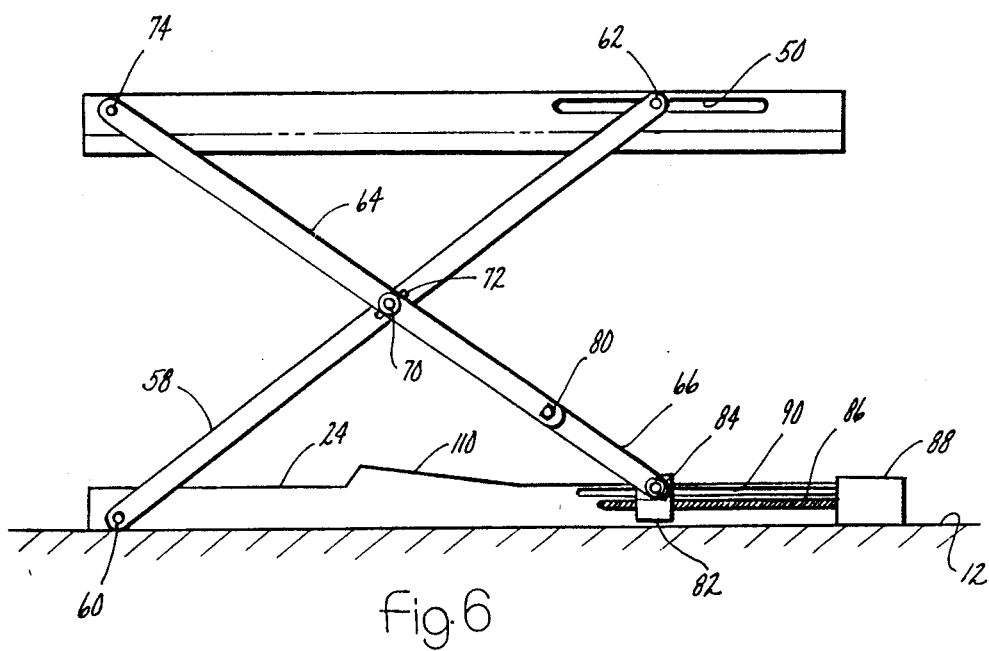
FIG. 6 is a view showing the linkage with the platform in its raised retracted position.

Referring to FIGS. 5 and 6, link means 54 include a link 58 having its lower end connected by pivot member 60 to one end of base element 24. The upper end of link 58 is connected by pin means 62 in slot 50 of the slider channel. The arrangement is such that link 58 moves down to a parallel position with respect to base element 24 as the platform is lowered, and raises the platform as the link is pivoted upwardly.

A two-part, second link is composed of link legs or elements 64 and 66. As best illustrated in FIG. 7, pivot means 70 passes through link 58, link element 64 and link element 66. Link 58 is sandwiched between link element 64 and link element 66. Link 58 has a short slot 72 receiving pivot means 70. Pivot means 70 is received through the upper end of link element 66 and about two-thirds of the way down from the upper end of link element 64. The upper end of link element 64 is connected by a pivot means 74 to slider channel 44 as best shown in FIG. 7.

Figure 8:
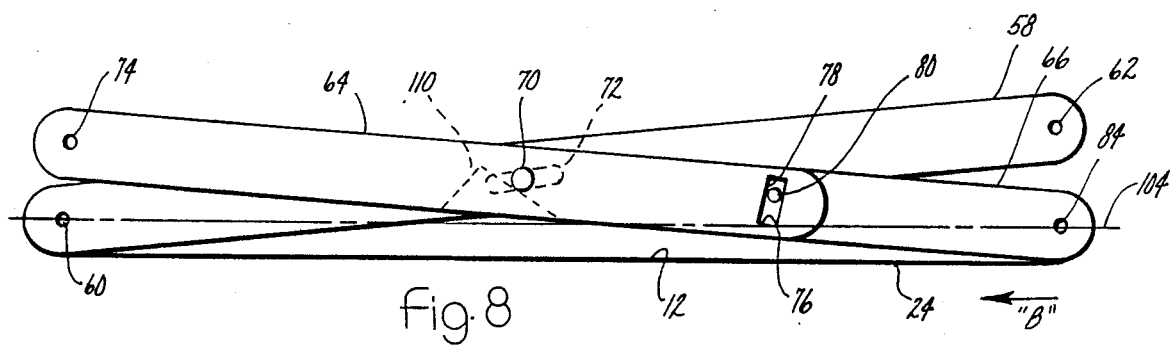
FIG. 8 is a view of the two-part link in its fully collapsed position.
Figure 9:
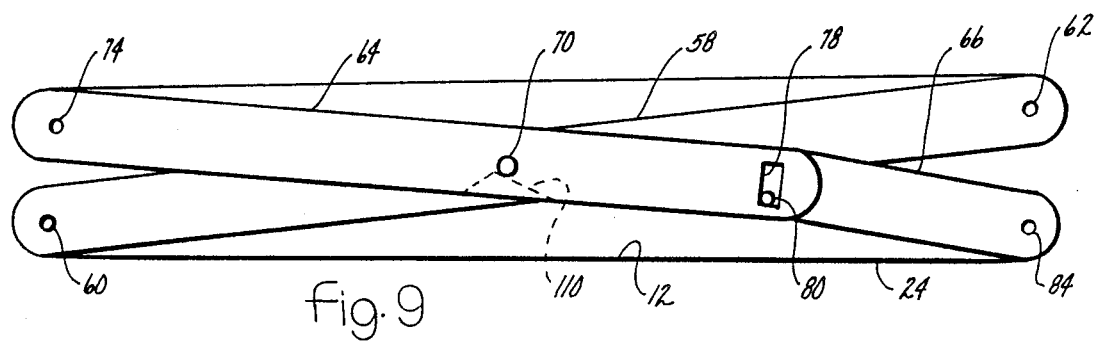
FIG. 9 is a view of the two-part link shortly after the beginning of the lifting stroke.

Referring to FIGS. 8 and 9, the lower end of link element 64 has a slot 76 curved in an arc generally about the axis of pin 70. The inner edge 78 of the slot provides a cam surface.

Link element 66 has a pin 80 received in slot 76 and engageable with cam edge 78 in a manner that will presently be described.

A worm driven nut 82 is connected by pivot means 84 to the lower end of link element 66.

A worm screw 86 is supported parallel to base element 24. Screw 86 is threadably engaged with nut 82 such that when the screw is rotated, the nut is moved in a direction depending upon the direction of rotation of the screw.

Figure 10:
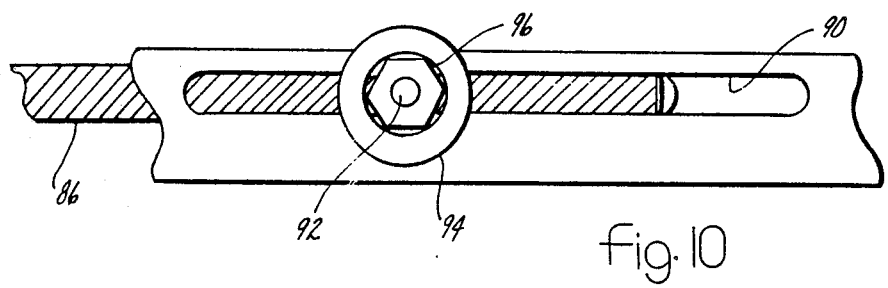
FIG. 10 is an enlarged view of the backside of the driven nut.

A 20-1 ratio, right angle gear box 88 is connected to one end of the screw. Referring to FIGS. 5, 6 and 10, base element 24 has a longitudinal slot 90. A guide pin 92, carried by the jack screw nut, is received in slot 90. A washer 94 and nut 96 are mounted on pin 92 so that it guides the nut along slot 90 as the screw is being rotated.

A reversible motor 100 is mounted off-center on base element 26 to clear any trunk lid latch intrusion and connected by a covered flexible shaft 102 to the input of gear box 88. When electrically engaged, the motor is adapted to rotate the screw and thereby move the worm screw driven nut. The gear box reduces the rate of rotation of the motor down to that of the screw.

The jack screw nut cooperates with a companion nut on the opposite side of the base to raise or lower the platform depending upon the direction of rotation of the motor. As nut 82 moves toward pivot 60, the two links are pivoted upwardly to raise the platform. When the screw is rotated in the opposite direction to move the nut away from pivot 60, the links pivot downwardly in a scissors-like manner to a fully collapsed position, as illustrated in FIG. 8, in which link elements 64 and 66 are adjacent base element 24.

Referring to FIGS. 8 and 9, when the links are in their fully collapsed position, adjacent to base element 24, central pivot means 70 is generally disposed in a position adjacent a line 104 passing between pivot means 60 and 84. Because the screw moves nut 82 in a linear direction towards pivot 60, there is a so-called dead spot at the beginning of the lifting stroke, where there is little torque available to raise link element 64 and link 58. However, in this position, as link element 66 is moved in direction "B", cam pin 80 engages cam edge 78 to move downwardly in the slot and thereby pop link 58 and the end of link element 64 upwardly. This motion is sufficient to cause a misalignment between the two elements, link 64 and 66. Link 64 pivots around pivot 74, and link 58 pivots around pivot 60 to raise pivot 70 to provide a sufficient torque to start raising the platform.

In addition, a cam ramp 110 is mounted on base element 24 in the path of motion of pivot pin 70. As link element 66 is moved toward the ramp, pin 70 is cammed upwardly to pivot the end of link element 66 upwardly as well as to pivot link 58 and link element 64.

Slots 72 and 76 provide a sufficient clearance for the pins engaged in such slots to obviate any tendency of the linkage mechanism to become locked in position.

Referring to FIG. 1, motor 100 is connected to a second covered flexible shaft 120 which in turn is connected to a 20-1 gear box 122 through a worm screw and driven nut (not shown) for raising and lowering linkage means 56. Linkage means 56 includes a worm screw shaft, a nut and three link members which move in unison with their counterparts in linkage means 54, but on the opposite side of the platform. Thus, the two linkage means cooperate in raising or lowering the platform when the motor is energized.

Referring to FIG. 6, as the platform is being lowered, pin 74 is slightly lower than pin 62 so the platform has a slight incline. The reason for this is that the platform is slideable horizontally through the trunk opening. However, when it is in its retracted position above the base, its inner-most edge is lower than its outer-most edge to obviate any tendency of the platform to fall out toward its extended position. The platform is returned to a position parallel to the floor of the trunk when link means 64 is lowered to the position illustrated in FIG. 9 and the jack screw moves a sufficient distance to pull cam pin 80 toward the center of slot 76. Link element 64 then drops to its fully collapsed position, illustrated in FIG. 8.

Motor 100 is preferably connected to a DC power source 130 which may be the vehicle battery, through circuit means 132. Circuit means 132 includes a remote, hand-operated over-center, off switch 134, a commercially-available product which automatically returns to a neutral position when the user releases pressure from the switch element. This provides a safety feature that stops the motor and the moving linkage when the user has removed his operating hand from the switch.

Referring to FIG. 7, floor mat 140 provides another safety factor for protecting the users' fingers from the moving linkage. The floor mat is attached to the top of the platform and has a curved side edge at 142 along both sides of the platform. The curved side edge is formed to naturally curve down over the slider means and the upper ends of the linkage mechanism. Thus, should the user grab the side edge of the platform to slide it out of the trunk, his fingers are shielded from the moving linkage components.

Figure 11:
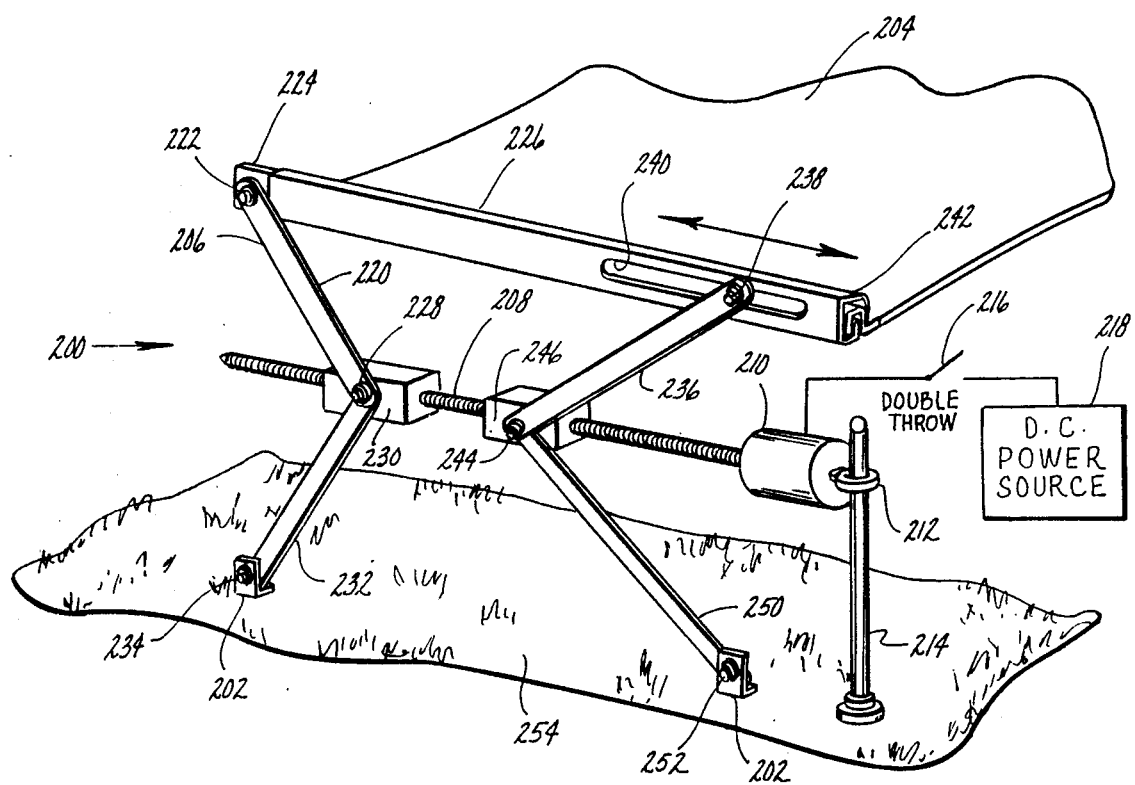
FIG. 11 is a view of another embodiment of the invention employing a toggle linkage for raising the platform.

FIG. 11 illustrates another embodiment of the invention 200 which includes base means 202 and a platform 204 supported by linkage means 206. A corresponding linkage means (not shown) supports the opposite edge of the platform.

Linkage means 206 includes a horizontal threaded jack screw or power shaft 208 connected to a reversible motor 210 mounted by a collar 212 on a loosely fitted guide bar 214. Motor 210 rises and falls with the platform. The motor is connected by a switch 216 to DC power source 218.

An upper link 220 has one end connected by pivot means 222 to the inner member 224 of slider means 226. The lower end of link 220 is pivotally connected by pivot means 228 to a collar 230 mounted on power shaft 208. A lower link 232 has its lower end connected by pivot means 234 to the base and its upper end connected by pivot means 228 to collar 230. A second, upper link 236 has its upper end mounted by pin means 238 in a slot 240 in channel 242 of the slider means. The lower end of link 236 is connected by pivot means 244 to a second collar 246. Collar 246 is also threadably mounted on power shaft 208. A lower link 250 has its lower end connected by pivot means 252 to the base and its upper end connected by pivot means 244 to collar 246.

The arrangement is such that when motor 210 is energized to rotate the power shaft in one direction, the two collars move toward one another to collapse the links in a scissors-like manner to lower the platform toward the base.

When collars 230 and 246 are moved away from one another by the reversed rotation of motor 210, the links are unfolded to raise the platform above the base. Platform 204 is moveable on the slider means in a direction generally parallel to floor 254. Slot 240 defines the limits of the horizontal travel of the platform.

Having described my invention, I claim:

1. A linkage means comprising:
   a base;
   a first link;
   first pivot means mounted on the base and connected to the first link to permit pivotal motion thereof with respect to the base;
   a second link means comprising a first link leg and a second link leg;
   a second pivot means mounted on the base and connected to the first link leg for pivotal motion thereof with respect to the base;
   means for moving the second pivot means along a path of motion toward the first pivot means;
   a third pivot means connecting the first link to the second link leg in a position spaced with respect to the first and second pivot means, the third pivot means being moveable to a position disposed between the first and second pivot means along said path of motion;
   a first cam means mounted on the first link, and a second cam means mounted on the second link leg, the second means being engageable with the first cam means such that as the second pivot means is moved along said path of motion, the third pivot means is cammed away from said path of motion permitting the second link to pivot the first link about the first pivot means.

2. A combination as defined in claim 1, in which the first cam means includes means having a slot with a cam edge, and the second cam means is a pin receivable in the slot so as to engage the cam edge.

3. For use in a vehicle trunk or the like having a floor, and a trunk opening disposed above the floor, a power-operated lift comprising:
   a base and means mounting same on the trunk floor;
   a platform and support means mounting the platform on the base;
   power-operated means for moving the platform between a lower position adjacent the base and a raised position above the base depending upon the distance the trunk opening is above the floor, in a direction generally perpendicular to the trunk floor;
   the platform being moveable with respect to the base in a direction generally parallel to the floor from said raised position toward said trunk opening;
   the support means including slider means for engaging the platform, the slider means being moveable with the platform as it is being moved by the power-operated means, and permitting the platform to be manually moved from said raised position toward said trunk opening; and
   the platform having a planar load-bearing surface and the power-operated means is adapted to lower the platform and the slider means in a first attitude in which the load-bearing surface of the platform is inclined to prevent the platform from falling toward said trunk opening.

4. A combination as defined in claim 3, in which the support means move the platform to a second attitude with respect to the base as the platform reaches said lower position.

5. For use in a vehicle trunk or the like having a floor, and a trunk opening disposed above the floor, a power-operated lift comprising:
   a base and means mounting same on the trunk floor;
   a platform and support means mounting the platform on the base;
   power-operated means for moving the platform between a lower position adjacent the base and a raised position above the base depending upon the distance the trunk opening is above the floor, in a direction generally perpendicular to the trunk floor;
   the platform being moveable with respect to the base in a direction generally parallel to the floor from said raiser position toward said trunk opening;
   the support means comprising:
   a first link;
   first pivot means mounted on the base and connected to the first link to permit pivotal motion thereof with respect to the base;
   a second link;
   a second pivot means mounted on the base and connected to the second link to permit pivotal motion thereof with respect to the base, the second pivot means being spaced with respect to the first pivot means;

a third pivot means connecting the first link to the second link in a scissors-like manner;

means connecting the power-operated means to the second pivot means for moving same with respect to the first pivot means along a path of motion whereby the platform is moved with respect to the base;

the third pivot means being moveable to a position disposed between and aligned with the path of motion of the second pivot means toward the first pivot means, and the second link includes a first link leg and a second link leg, and including a first cam means mounted on the first link leg, a second cam means mounted on the second link leg engaged with the first cam means such that as the second pivot means is moved toward the first pivot means, the third pivot means is moved from said aligned position toward a misaligned position permitting the second link to pivot the first link about the first pivot means as the second pivot means is being moved by the power-operated means.

6. A combination as defined in claim 5, in which the first cam means includes means on one of the link legs having a slot with a cam edge, and the second cam means is a pin carried by the other of said link legs and receivable in the slot so as to engage the cam edge.

7. A combination as defined in claim 5, in which third pivot means includes a pin, and including a ramp mounted on the base, the pin being engageable with the ramp such that as the second pivot means is being moved toward the first pivot means to raise the platform from said lower position, the pin engages the ramp to move the first link with respect to the second link.

* * * * *